United States Patent [19]
Zagorzycki et al.

[11] Patent Number: 4,763,770
[45] Date of Patent: Aug. 16, 1988

[54] TRAVELING VIBRATING DIVERTER FEED SYSTEM

[75] Inventors: Peter E. Zagorzycki, Lansdale; Benicio I. Dussan V., Philadelphia, both of Pa.

[73] Assignee: Proctor & Schwartz, Inc., Horsham, Pa.

[21] Appl. No.: 919,179

[22] PCT Filed: Jan. 23, 1986

[86] PCT No.: PCT/US86/00128
  § 371 Date: Sep. 5, 1986
  § 102(e) Date: Sep. 5, 1986

[87] PCT Pub. No.: WO86/04315
  PCT Pub. Date: Jul. 31, 1986

Related U.S. Application Data

[63] Continuation of Ser. No. 693,909, Jan. 23, 1985, abandoned.

[51] Int. Cl.⁴ .............................................. B65G 37/00
[52] U.S. Cl. .................................... 198/364; 198/585; 198/594
[58] Field of Search ............... 198/364, 637, 585, 594, 198/533, 631, 635, 812; 414/272, 300

[56] References Cited

U.S. PATENT DOCUMENTS

| 2,833,390 | 5/1958 | Greulich . | |
|---|---|---|---|
| 3,138,408 | 6/1964 | Bruce et al. . | |
| 3,153,477 | 10/1964 | Tipton . | |
| 3,550,752 | 12/1970 | Gregor | 198/364 X |
| 3,590,983 | 7/1971 | Oury | 198/364 X |
| 3,877,585 | 4/1975 | Burgess, Jr. | 198/585 X |
| 4,381,734 | 5/1983 | Patz et al. | 198/364 X |
| 4,593,651 | 6/1986 | McCarthy et al. | 198/364 X |

FOREIGN PATENT DOCUMENTS

| 490748 | 1/1930 | Fed. Rep. of Germany | 198/364 |
|---|---|---|---|
| 2358311 | 6/1975 | Fed. Rep. of Germany | 198/637 |
| 1109351 | 8/1984 | U.S.S.R. | 198/631 |

*Primary Examiner*—Robert J. Spar
*Assistant Examiner*—D. Glenn Dayoan

[57] ABSTRACT

A conveyor system comprising a first endless belt conveyor; a vibrating conveyor at an angle to the endless belt conveyor including a vibrating mechanism positioned beneath the belt conveyor to vibrate the belt conveyor along with the vibrating conveyor and to fluidize product on the belt conveyor; a diverter blade in contact with the belt conveyor adapted to vibrate with the belt conveyor, the blade being positioned and angled to divert fluidized product from the belt conveyor to the vibrating conveyor.

18 Claims, 4 Drawing Sheets

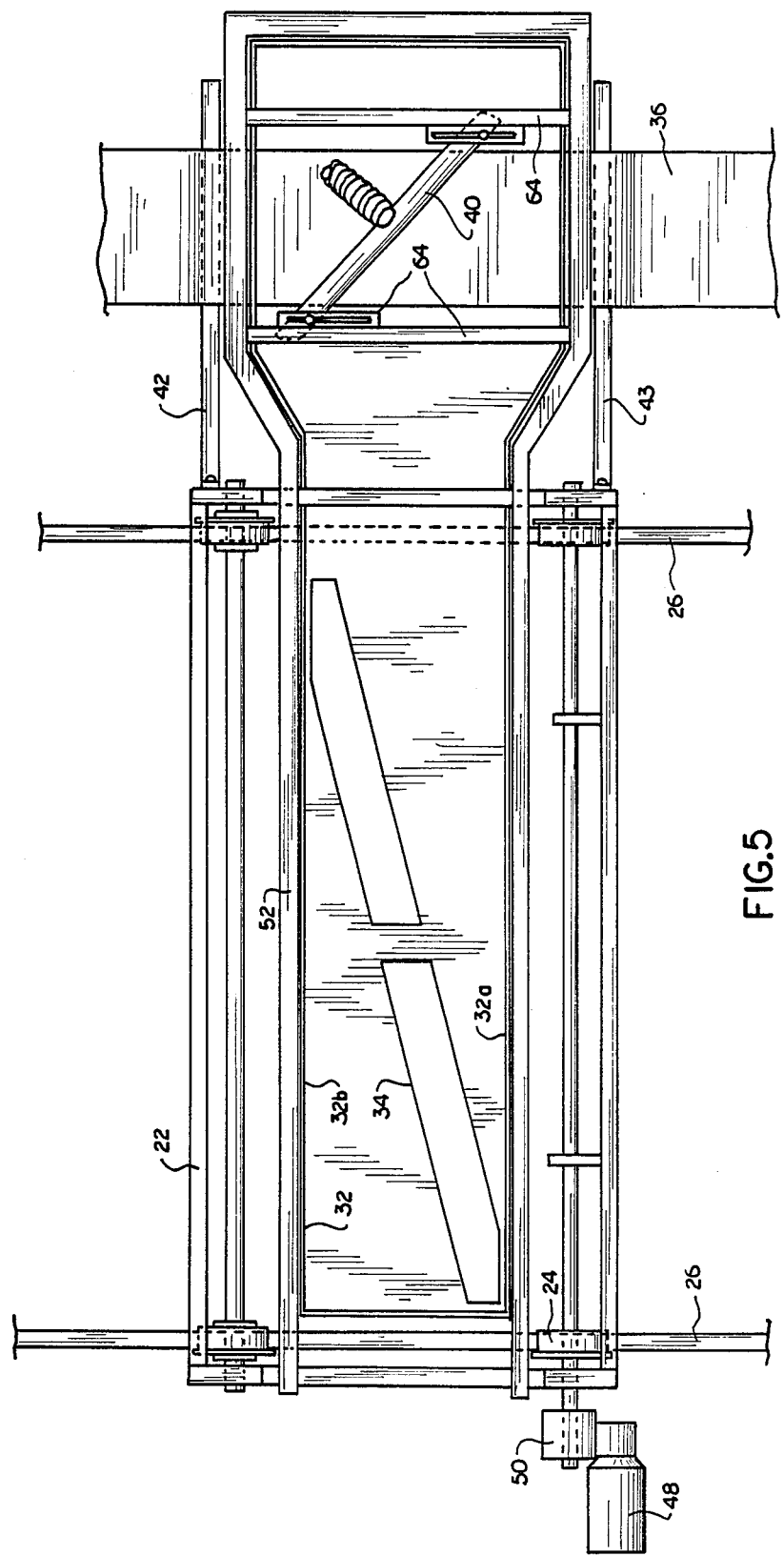

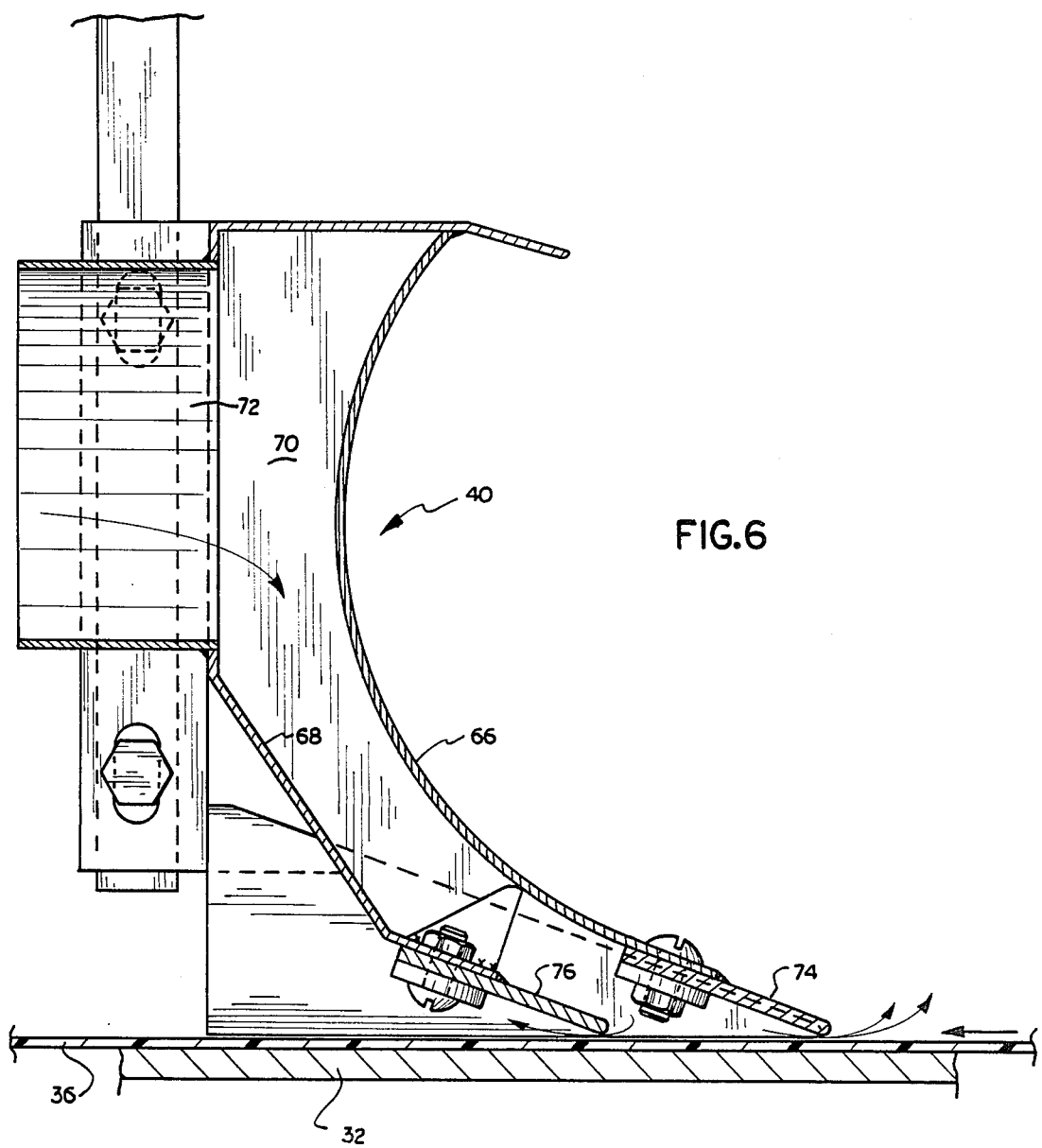

TRAVELING VIBRATING DIVERTER FEED SYSTEM

This application is a continuation of application Ser. No. 693,909, filed Jan. 23, 1985, now abandoned.

TECHNICAL FIELD

The present invention relates to a conveyor system, and particularly to means for diverting product from a feed conveyor onto a second conveyor at an angle to the feed conveyor.

The present invention will be particularly described with respect to the distribution of delicate or frangible particulate products, such as bran flakes, to a surge or storage bin, although it will be apparent to those skilled in the art that the present invention has other applications.

BACKGROUND OF THE INVENTION

The present invention is particularly concerned with the distribution of frangible or delicate products, such as cereal bran flakes, into a storage or surge bin. Conventionally, such storage or surge bins are rectangular in cross section, open at the top, and several feet in depth. The floor of the bin is usually a belt conveyor adapted to move product in the direction of the bin discharge end. A picker or doffer at the discharge end is adapted to unload product conveyed to such end by the floor conveyor. One purpose of such bins is to provide a uniform feed to downstream equipment, for instance a dryer.

Loading a surge bin in this invention is complicated by the fragility or brittleness of the product. It is known to use a vibrating distributing conveyor mounted across the top of the bin on a trolley which moves lengthwise back and forth, along the bin. The position of the trolley is controlled by a sensor system which detects the position of the product pile in the bin. In operation, product is fed onto the vibrating distributing conveyor at a point to one side of the bin. The distributing conveyor is in the shape of a shallow pan, and vibration of the pan causes the product to flow towards a slot in the bottom of the pan, and to drop through the slot into the bin.

One problem in loading a storage or surge bin is transferring the product (e.g., cereal bran flakes) from a source to the vibrating pan conveyor. In practice, this may be done by using a hopper which deposits product onto what is referred to as a reverse wrapped belt conveyor. This type of belt conveyor has a delivery end above the vibrating pan conveyor feed point, the delivery end being adapted to travel with or follow the vibrating pan conveyor as the latter moves along the bin length. The belt is of the continuous type, with a stationary drive drum. As the belt delivery end moves towards or away from the drum, slack in the belt is taken up or given by a pair of drums beneath said delivery end defining a reverse loop in the belt, wherein the pair of drums and reverse loop are adapted to move with the belt delivery end and in the same direction the belt delivery end is moving. Obviously, the apparatus is extremly cumbersome, subject to high maintenance costs, and unsanitary in that it is hard to clean, among other disadvantages.

Various other arrangements have been proposed to transfer product from one conveyor to another. One example is a Greulick U.S. Pat. No. 2,833,390, which is provided with means to tip or canter the conveyor belt so that product on the conveyor belt can fall off of or be displaced onto a second belt positioned along the lower side of the tipped or cantered belt.

A Bruce et al U.S. Pat. No. 3,138,408 and a Tipton U.S. Pat. No. 3,153,477, both disclose use of a diverting blade on a belt to transfer product from the belt. Jepsen U.S. Pat. No. 3,827,777 shows the use of an air cushion for diverting product. In the '408 patent, means are provided for directing air beneath the diverting blade to prevent fibers from passing under the diverter and jamming the belt. This use of air alone at sufficiently high pressure to prevent jamming, with lightweight cereal product on the belt, would be likely to inadvertently scatter the product off the belt rather than direct it onto a second belt.

In the '477 patent, means are provided for producing a hump in the belt immediately ahead of the diverter blade or deflector. The purpose of this is to prevent flat pieces of mail from passing underneath the deflector or blade. The system would not likely be effective with the diversion of particulate cereal products.

Similarly, the use of an air cushion as in the '777 patent would tend to scatter product off the belt, and would not be suitable in the present process.

DISCLOSURE OF INVENTION

The present invention overcomes the above disadvantages in providing a feed system comprising a transversely extending elongated vibrating conveyor having an upper product carrying surface and a discharge area; means for vibrating said conveyor; a feed belt including an upper product carrying surface; a diverter blade engaging said feed belt product carrying surface; means to vibrate said feed belt in a defined area ahead of said blade, with regard to the oncoming product, to fluidize product on the belt product carrying surface in said area; said belt and diverter blade being positioned with regard to the vibrating conveyor to transfer the fluidized product onto the vibrating conveyor at a point remote from the vibrating conveyor discharge area.

Preferably, the vibrating conveyor is a vibrating pan conveyor.

Also, in a preferred embodiment, the diverter blade is in the form of a plenum chamber with aperture means in the edge contacting the feed belt upper product carrying surface to disperse air under pressure into the area between the feed belt and diverter blade edge against the oncoming fluidized product.

Also, in a preferred embodiment, the conveyor system of the present invention is for loading a surge bin wherein a trolley is provided adapted to move longitudinally along the bin; the system comprising a vibrating pan conveyor supported by said trolley extending laterally across the bin; means to vibrate said pan conveyor relative the trolley; a closed loop feed belt extending longitudinally along one side of the surge bin; said vibrating pan conveyor extending beneath the belt and supporting the belt so that the belt vibrates with the pan fluidizing product on the belt; means isolating the area of the belt vibrated by the pan from the rest of the belt so that the vibration is confined to the area of the pan; diverting blade means riding on the belt upper side vibrated with the belt; said blade means being angled and positioned so as to divert fluidized product from the blade to the pan.

BRIEF DESCRIPTION OF DRAWINGS

The present invention will become further apparent from the following description with reference to the accompanying drawings, in which

FIG. 5 is a plan view of the conveyor system of FIG. 4, but showing a preferred support arrangement for the diverter blade; and FIG. 6 is a further enlarged section view of a portion of the apparatus of FIGS. 4 and 5.

Referring to FIGS. 1-3, the conveyor system 12, FIG. 1, is positioned above a rectangular surge bin 14 (FIGS. 2 and 3). Representative dimensions of the surge bin are; length 10-50 feet; width 4-12 feet; overall heights about 11 feet. The bin may accommodate a product depth, by way of example, of about 2-6 feet.

Again, the present invention is primarily useful for distribution of fragile or brittle food products such as cereal bran flakes into the surge bin.

Figure 2:
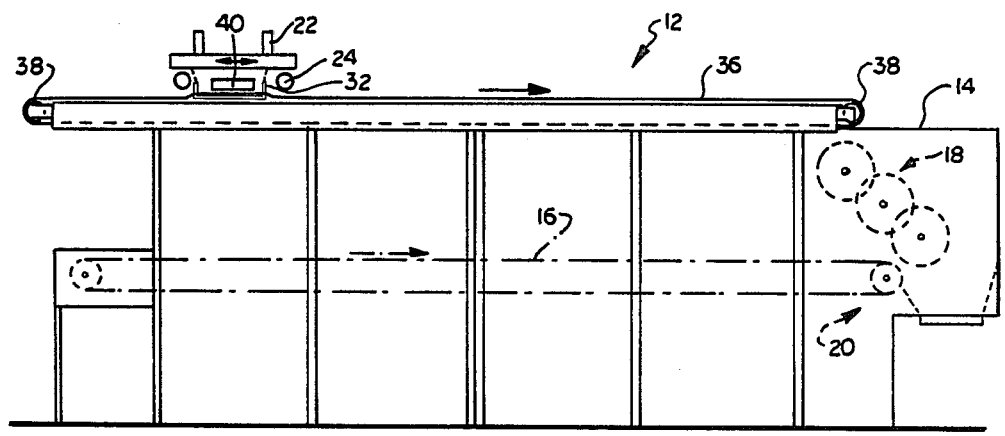
FIG. 2 is a reduced-size elevation view of a surge bin in association with the conveyor system of FIG. 1.

As shown in FIG. 2, the floor of the bin comprises an endless belt conveyor 16 having an upper flight adapted to move in the direction of a delivery end 20 of the surge bin. A plurality of pickers or doffers 18 at the delivery end of the bin cooperate with the conveyor to unload the bin, following known practice.

Figure 1:
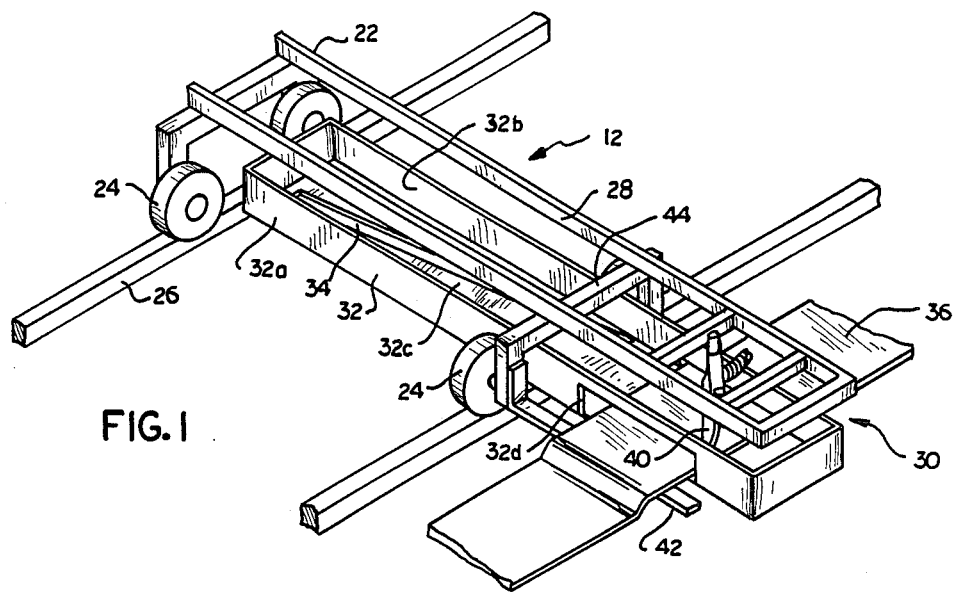
FIG. 1 is a schematic perspective view of the conveyor system of the present invention.

The conveyor system of FIG. 1 comprises a trolley 22 mounted on pairs of rollers 24 riding on tracks 26. The tracks are in turn positioned along the topsides of the surge bin 14 so that the trolley can move longitudinally along the bin from one end to another.

The trolley is provided with a framework 28 (FIG. 1), which extends laterally across the bin and then outboard to the right side 30 of the bin. A vibrating shallow-pan conveyor 32 is supended beneath the trolley framework and extends laterally across the bin and also off to the side 30, as with the trolley. The pan is provided with opposed sides 32(a) and 32(b) and a product carrying surface 32(c) having a diagonal or cross bias slot 34 through which product in the pan drops downwardly into the bin 14. The purpose of the cross bias slot is to distribute product uniformly across the full width of the bin as the trolley and pan conveyor move longitudinally.

Figure 3:
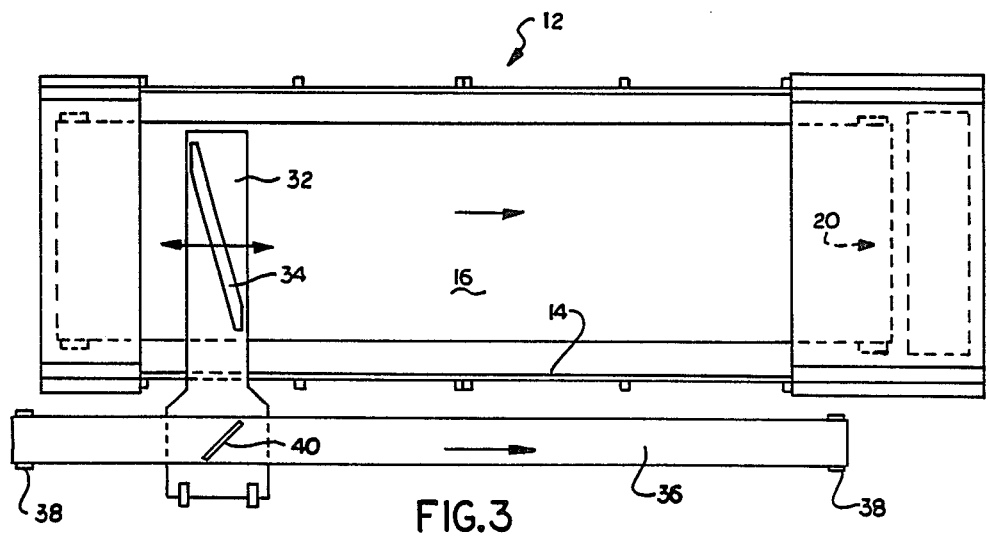
FIG. 3 is a plan view of the surge bin apparatus of FIG. 2 and accompanying conveyor system.

The pan is suspended from the framework 28 and vibrated by means to be described. In addition, motor actuating means, also to be described, is provided to drive one of the rollers 24 and move the trolley longitudinally. Still referring to FIGS. 1, 2 and 3, product is delivered to the shallow vibrating pan 32 by means of an elongated, endless or closed loop belt conveyor 36 turning on end drums 38. A diverter blade 40 rides against the upper surface of the belt 36 and is positioned and angled with regard to the conveyor assembly to direct product on the belt into the vibrating pan. Isolation pads 42 (FIG. 1) alongside the vibrating pan, on opposite sides of the pan, are supported from a "U" shaped bracket 44 attached to framework 28 and rollers 24.

As shown in FIG. 1, the belt 36, in the area between the isolation pads, is threaded through openings 32(d) in the vibrating pan conveyor sides 32(a) and 32(b), at a point remote from the bias slot. Between the openings 32(d), the belt rides over the surface of the vibrating pan and is vibrated in unison with and by vibration of the pan. The isolation pads 42 limit the vibration only to the area between the pads, preventing transmission of the vibration to the rest of the belt. By means of the vibration, advancing or oncoming product on the belt 36 carrying surface is converted to a fluidized state in the area ahead of the blade 40, permitting the blade to readily scoop the product from the belt onto the vibrating pan. It should be noted that the isolation pads 42, in addition to isolating the oncoming portion of the belt 36 from vibration, also serve to support the belt so that it goes through the vibrating diverter with a minimum of drag and/or wear, in effect isolating the vibrating belt and tray from the inherent feed belt tension forces.

Figure 4:
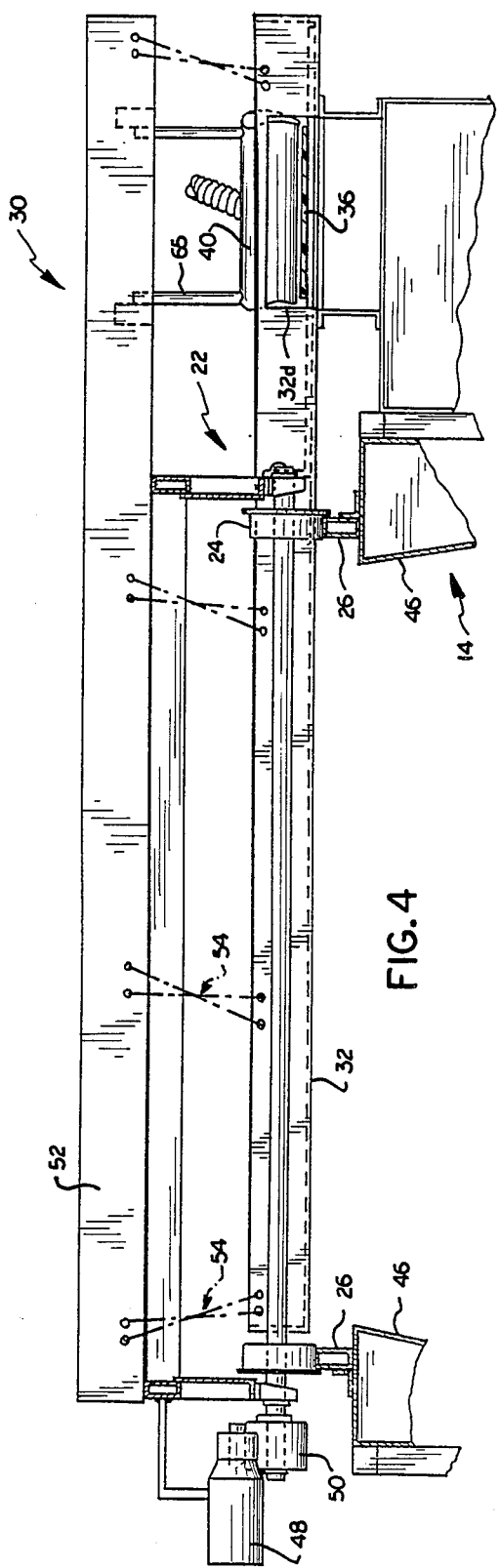
FIG. 4 is a detailed, enlarged elevation view of a portion of the conveyor system of FIG. 1.

Further details of the system of the present invention are shown in FIGS. 4-6.

Figure 4A:
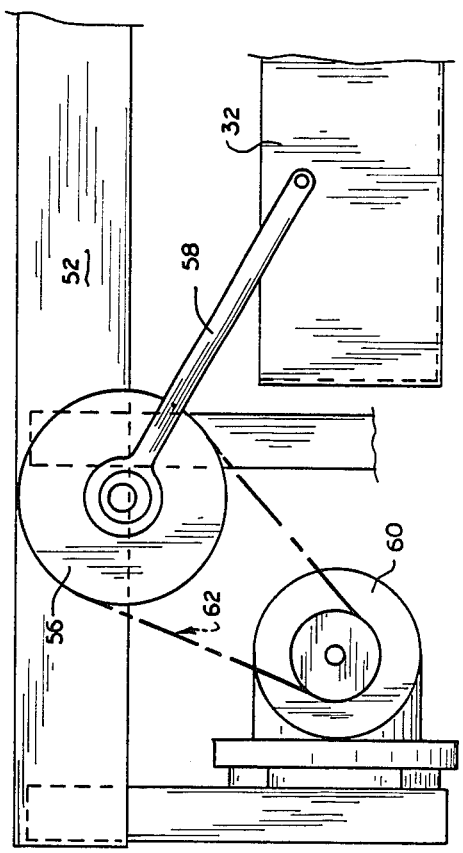
FIG. 4a is an enlarged elevation of a vibrating mechanism for the conveyor system of FIG. 4.

Referring to FIGS. 4 and 5, there is illustrated the surge bin 14 having upright sides 46, and longitudinally extending tracks 26 supported by the sides. Trolley 22 is adapted to ride on the tracks 26 via rollers 24. A motor 48 drives the trolley 22 through a speed reducer 50. The trolley 22 supports along the top a heavy piece of tubing 52 which extends across the width of the trolley and out over the righthand side 30, as shown in the Figure. The vibrating pan 32 is suspended from the tubing 52 by means of flat springs 54 in a conventional manner. Details of the vibrating mechanism are shown in FIG. 4a. An eccentric 56 is mounted at one end of the tubing 52 and is provided with arm 58 connected to the vibrating pan 32. A motor 60 drives the eccentric 56 through belt 62. This, in turn, causes the pan 32 to vibrate with each revolution of the eccentric.

Referring to FIG. 5, a framework 64 is constructed across the pan, on the outboard side, and the diverter blade 40 is rigidly connected to the framework so that the blade vibrates in unison with the pan. Optionally, the blade can be vibrated by a separate vibrating source, so that the pan conveyor and diverter or blade vibrate independently of each other. In such case, the vibrating diverter blade may be independently attached to the trolley framework 52 by flat springs 65, as shown in FIG. 4.

Details of the blade are shown in FIG. 6. Essentially, the blade comprises a curved front side 66, shaped so as to have a scooping action on the oncoming fluidized product, and a rear side 68 defining with the front side a plenum chamber 70. The rear side 68 is provided with an opening 72 connected to a suitable source of air (not shown) under pressure. The bottom edges of the blade front and rear sides 66 and 68 are provided with wear strips 74 and 76, respectively, adapted to rest against the upper surface of endless belt 36. Also shown in FIG. 6 is a portion of the bottom of the vibrating pan 32. Again, in operation, the arrangement of components preferably is such that the pan 32, belt 36 and blade 40 vibrate in unison. The result is that product advancing towards the blade on belt 36 is similarly vibrated and fluidized. In such a fluidized state, it is readily scooped from the belt 36 by the blade 40 onto the vibrating pan, without the passage of product between the blade and belt, in such a way as to cause pulverization of the product or jamming of the blade and belt.

In this regard, one can visually see a rounded pile of advancing product on the belt flatten and spread out as fluidization takes affect.

By introducing some air under pressure into the plenum chamber, diversion of even small particles of the material from the belt, rather than flow under the blade, is assured. This is particularly useful when handling products which are likely to generate an amount of dust and/or small particulates. As shown by the arrows in FIG. 6, the air under pressure in the plenum chamber flows from both the front (towards the advancing product) and back sides of the blade, but since the blade wear strips remain in firm contact with the surface of the belt, a minimum amount of air is utilized.

In this regard, the edges of the diverter blade effect a seal with the feed belt with a minimum of drag and/or wear.

The principal advantages of the present invention should now be apparent. Provided is a means which follows movement of the vibrating pan conveyor in a simple and facile manner, for depositing product on the conveyor, without the combersome and costly structure of the prior art and which is easy to clean and sanitary. In addition, the present invention is capable of transferring fragile or delicate product without product destruction.

We claim:

1. A vibrating diverter feed system comprising a transversely extending elongated vibrating conveyor having an upper product carrying surface and a discharge area;
   means for vibrating said conveyor;
   a feed belt including an upper longitudinally extending moveable product carrying surface;
   a diverter blade positioned at an intermediate point of said longitudinally extending surface;
   means to vibrate said feed belt in a defined area ahead of said blade, with regard to the oncoming product, to fluidize product on the belt product carrying surface in said area;
   said belt and diverter blade being positioned with regard to the vibrating conveyor to transfer the fluidized product onto the vibrating conveyor at a point remote from the vibrating conveyor discharge area.

2. The feed system of claim 1, wherein said vibrating conveyor and feed belt defined area are vibrated in unison.

3. The feed system of claim 1, wherein said vibrating conveyor, feed belt defined area, and diverter blade are vibrated in unison.

4. The feed system of claim 1, wherein said vibrating conveyor is moveable, said belt defined area and blade being moveable with the vibrating conveyor.

5. A vibrating diverter feed system comprising
   a transversely extending elongated vibrating pan conveyor including pan sides, a pan floor having an upper product carrying surface, and a discharge area;
   means for vibrating said pan conveyor;
   a closed loop feed belt threaded through the pan sides at a point remote from said discharge area adapted to slide on the pan floor;
   at least one isolation pad alongside the vibrating pan conveyor engaging the underside of the feed belt adapted to isolate the oncoming portion of the feed belt from the pan vibration and define a trailing portion;
   the feed belt trailing portion vibrating in unison with the vibrating pan conveyor and fluidizing product on said trailing portion; and
   a diverter blade engaging said feed belt trailing portion positioned and angled to direct the fluidized product from the feed belt to the pan conveyor.

6. The system of claim 5, including trolley means to move said vibrating pan conveyor longitudinally with respect to the feed belt.

7. The system of claims 5 or 6, including means to vibrate the diverter blade in unison with the pan conveyor.

8. A conveyor system comprising
   a first endless belt conveyor comprising a longitudinally extending moveable product carrying surface;
   a vibrating conveyor at an angle to the endless belt conveyor positioned at an intermediate point of said carrying surface including means positioned beneath the belt conveyor to vibrate the belt conveyor along with the vibrating conveyor to fluidize product on the belt conveyor;
   a diverter blade in contact with the belt conveyor adapted to vibrate with the belt conveyor, said blade being positioned and angled to divert fluidized product from the belt conveyor to the vibrating conveyor.

9. The conveyor system of claim 8, wherein said vibrating conveyor is a vibrating pan.

10. The conveyor system of claim 9, wherein said diverter blade defines a plenum chamber adapted to provide an air-knife seal with the belt conveyor to prevent small particles from passing under the diverter blade.

11. A conveyor system comprising
    a first endless belt conveyor;
    a vibrating conveyor at an angle to the endless belt conveyor including means positioned beneath the belt conveyor to vibrate the belt conveyor along with the vibrating conveyor to fluidize product on the belt conveyor;
    a diverter blade in contact with the belt conveyor adapted to vibrate with the belt conveyor, said blade being positioned and angled to divert fluidized product from the belt conveyor to the vibrating conveyor, said diverter blade defining a plenum chamber adapted to provide an air-knife seal with the belt conveyor to prevent small particles from passing under the diverter blade; and
    isolation pad means adapted to confine the vibration of the belt conveyor to the area of the vibrating pan.

12. A conveyor system for loading a surge bin comprising
    a trolley adapted to move longitudinally along said bin;
    a vibrating pan conveyor supported by said trolley;
    means to vibrate said pan conveyor relative the trolley;
    an endless belt extending longitudinally along one side of said surge bin;
    said vibrating pan extending beneath the belt and supporting the belt so that the belt vibrates with the pan fluidizing product on the belt;
    means isolating the area of the belt vibrated by the pan from the rest of the belt so that the vibration is confined to the area of the pan;

diverter blade means riding on the belt vibrating with the belt;

said blade means being positioned and angled to divert fluidized product from the blade to the pan.

13. A conveyor system comprising a first endless belt conveyor comprising a longitudinally extending moveable product carrying surface;

a receiving conveyor adjacent to an intermediate point of said longitudinally extending surface and at an angle to the endless belt conveyor;

vibrating means for vibrating the belt conveyor in the area of the receiving conveyor to fluidize product on the belt conveyor; and a diverter blade contiguous with the belt conveyor, said blade being positioned and angled to divert fluidized product from the belt conveyor to said receiving conveyor.

14. The conveyor system of claim 13, wherein said receiving conveyor, diverter blade and vibrating means are movable longitudinally with respect to the longitudinal axis of the belt conveyor.

15. The conveyor system of claim 13, wherein said receiving conveyor is a vibrating pan conveyor.

16. The conveyor system of claim 13, wherein said diverter blade is adapted to vibrate in unison with the belt conveyor.

17. The conveyor system of claim 16, wherein said diverter blade defines a plenum chamber adapted to provide an air-knife seal with the belt conveyor to prevent small particles from passing under the diverter blade.

18. A conveyor system comprising a first endless belt conveyor;

a receiving conveyor adjacent to and at an angle to the endless belt conveyor;

vibrating means for vibrating the belt conveyor in the area of the receiving conveyor to fluidize product on the belt conveyor;

a diverter blade contiguous with the belt conveyor, said blade being positioned and angled to divert fluidized product from the belt conveyor to said receiving conveyor; and isolation pad means adapted to confine the vibration of the belt conveyor to the area of the receiving conveyor.

* * * * *